United States Patent [19]
Weber

[11] 3,821,609
[45] June 28, 1974

[54] EXPLOSION-PROOF HOUSING MEANS FOR ELECTRICAL CIRCUITRY USED IN MINING MACHINERY

[75] Inventor: Karl-Heniz Weber, Witten-Heven, Germany

[73] Assignee: Gebr. Eickhoff Maschinenfabrik und Eisengiesserei m.b.H., Bochum, Germany

[22] Filed: Aug. 29, 1973

[21] Appl. No.: 392,630

[30] Foreign Application Priority Data
Sept. 8, 1972 Germany.......................... 2244070

[52] U.S. Cl.............. 317/99, 317/120, 317/101 D, 317/DIG. 9
[51] Int. Cl..................... H02b 1/10, H02b 1/12
[58] Field of Search....... 317/DIG. 9, 18 C, 99, 101, 317/101 R, 101 CB, 101 D, 101 CM, 101 CW, 118, 120

[56] References Cited
UNITED STATES PATENTS

| | | |
|---|---|---|
| 2,807,755 | 9/1957 | Thayer............................ 317/18 C |
| 3,004,230 | 10/1961 | Levinsohn...................... 317/101 D |
| 3,201,786 | 8/1965 | Anderson........................... 317/118 |
| 3,614,539 | 10/1971 | Hallenbeck......................... 317/99 |

Primary Examiner—Robert K. Schaffer
Assistant Examiner—Gerald P. Tolin
Attorney, Agent, or Firm—Brown, Flick & Peckham

[57] ABSTRACT

Apparatus for encapsulating electrical circuitry for mining machines in a pressure-tight housing for the mining machine drive motor means, the circuitry being adapted to connect high voltage elements within the housing to an external, intrinsically-safe circuit. The invention is characterized in the use of an insert fitted into an opening in the wall of the pressure-tight housing for the drive motor means, the insert carrying electrical coupling elements for interconnecting high voltage circuitry to low voltage circuitry and incorporating an explosion-proof chamber.

6 Claims, 4 Drawing Figures

PATENTED JUN 28 1974　　　　　　　　　　　　3,821,609
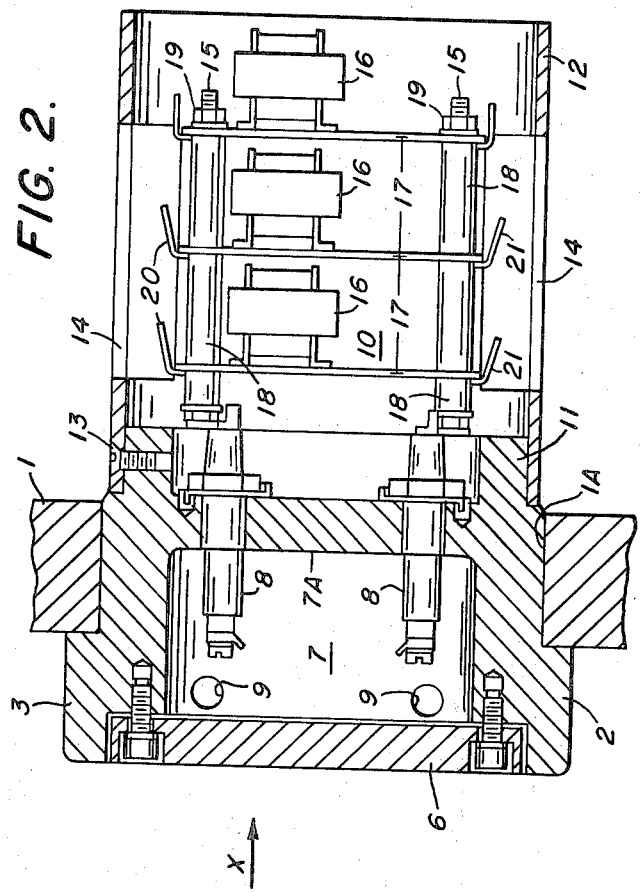
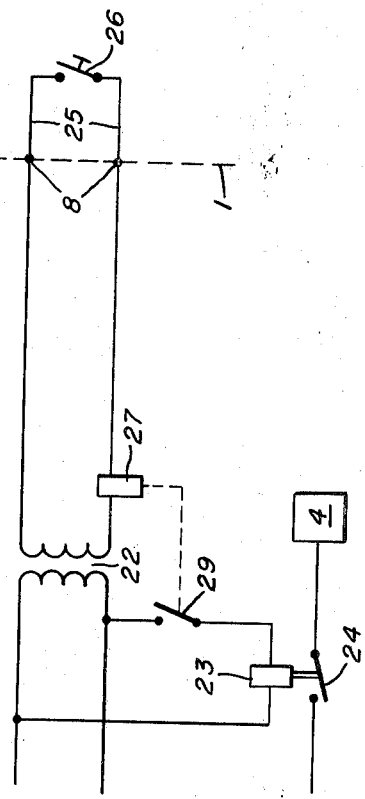
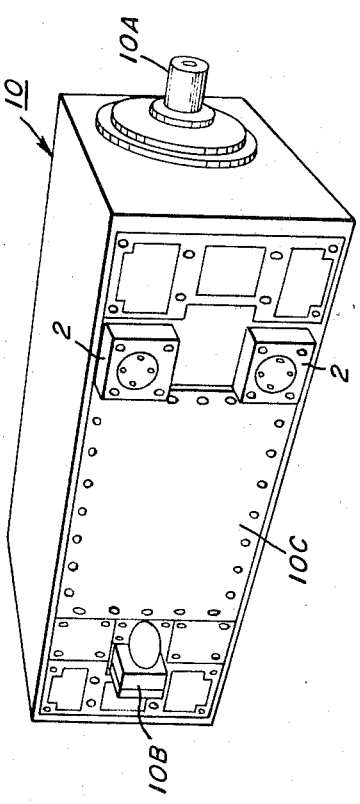

EXPLOSION-PROOF HOUSING MEANS FOR ELECTRICAL CIRCUITRY USED IN MINING MACHINERY

BACKGROUND OF THE INVENTION

In mining machines of the type used in underground mine roadways which may contain an explosive atmosphere, the drive motor means for the mining machine is enclosed within an explosion-proof casing which incorporates a switchgear box and a connection box. "Pressure-tight" encapsulation of this type is suitable for low voltage circuit breakers and the smaller types of low voltage motors, as well as for the slip rings of both small and large motors. It consists of a housing which is closed on all sides, which is not actually gas-tight, but is pressure-tight. It will withstand any explosion within its interior whose pressure, according to experience, cannot rise above about 8 atmospheres. In addition, care must be taken to insure that no explosion flame within the encapsulation can break through to the outside by making the contact areas of the flanges, glands and bearing surfaces for the housing covers large enough, and by making the air gaps around such covers small. This also insures that should an explosion occur within the interior of the pressure-tight housing, the gases will cool down sufficiently in passing the contact areas of the flanges and before they reach the outer, explosive atmosphere. Furthermore, a pressure-tight housing must be secure against particle ignition and electrical breakdown as might occur, for example, after a short-circuit within the housing. That is, it must not be possible for incandescent particles of metal to be driven through a gap around an access door where they can ignite any explosive atmosphere which may be present outside the housing.

While high voltage circuit elements must be encapsulated in a pressure-tight housing of the type described above, an intrinsically-safe electrical circuit need not be protected in this manner. "Intrinsically-safe" circuits are those in which so little power flows that there exists neither a shock hazard nor the danger of igniting explosive mixtures as a result of a short-circuit or as a result of excessive heating. Thus, in the case of intrinsically-safe circuits such as those used for telecommunication apparatus and remote control devices, it is not necessary to attain protection of the electrical equipment against the possibility of explosion by pressure-tight encapsulation but rather via the intrinsic safety of the installation itself. An intrinsically-safe circuit must, however, be separated from other electrical apparatus in order to obviate the encouragement of extraneous, high voltages which could cause an explosion.

Intrinsically-safe circuitry is ordinarily powered from the high voltage circuitry for the mining machine via transformers incorporated in coupling circuits between the high voltage circuits and the intrinsically-safe circuits. In the past, such coupling circuitry was incorporated into special pressure-tight chambers that were connected via a special explosion-proof connecting box with the pressure-tight housing for the mining machine drive motor. Such coupling circuits ordinarily incorporated a transformer which reduced the operating voltage of the main power circuit for the mining machine to a voltage sufficient to monitor, or remotely control. Upon closure of a switch contact in an external, intrinsically-safe circuit, for example, a relay is energized within the pressure-tight housing for the drive motor to actuate a high voltage control element for controlling the mining machine.

In mining machines which operate underground and which must be moved within narrow confines in mining machine roadways, it is highly desirable to reduce the size of the equipment utilized on the mining machine to the smaller possible dimensions. In the past, the use of intrinsically-safe circuits to control the mining machine acted against an attempt to keep the dimensions of the mining machine small. This was because the coupling of intrinsically-safe circuits to the individual elements of the high voltage circuitry within the pressure-tight chamber was invariably made via special chambers external to the pressure-tight housing for the motor.

SUMMARY OF THE INVENTION

In accordance with the present invention, apparatus for interconnecting the high voltage circuitry within a pressure-tight housing for a mining machine motor with external, intrinsically-safe circuitry is achieved without the use of auxiliary pressure-tight chambers and without increasing the overall size of the mining machine. Specifically, the invention provides a means whereby an external, intrinsically-safe circuit is coupled to the high voltage circuitry within a pressure-tight housing for a mining machine drive motor by means of an insert fitted into an opening within the motor housing and sealed thereto to maintain the housing pressure-tight. Electrical circuit elements are carried on the insert within the pressure-tight housing for transforming high voltage electrical energy to low voltage energy suitable for use in an intrinsically-safe circuit. An explosion-proof chamber is formed on the forward face of the insert; and terminal means extend through a wall of the insert and into the explosion-proof chamber, integral with the insert. The electrical circuit elements carried on the insert within the explosion-proof chamber are connected to the ends of the terminal means within the pressure-tight housing; while the intrinsically-safe circuit is connected to the aforesaid terminal means which extend through the wall of the insert within the explosion-proof chamber.

In this manner, the coupling circuits which connect the intrinsically-safe external circuits and the high voltage circuits within the motor housing are accommodated in a space-saving manner in the pressure-tight housing for the switchgear and drive motor and thereby avoid any additional space requirements for the intrinsically-safe circuitry. Since intrinsically-safe operating elements can be made especially compact, they can be mounted in favorable positions on the motor housing. Additionally, since the operating elements of the intrinsically-safe circuit have small dimensions and are provided with flexible electric cables, the point of mounting of the insert, in case of need, can be quickly changed underground to conform to local situations. Finally, the insert fitted into the pressure-tight motor housing can be conveniently removed and thereafter reinserted to permit any damage to the elements carried on the insert to be repaired underground very rapidly.

According to another characteristic of the invention, the forward end of the insert located in the pressure-tight motor housing is provided with one or more pins which are distributed around its periphery and which project into the pressure-tight motor housing, the coupling circuits being fastened in tandem to the pins. Advantageously, the coupling circuits are arranged on printed circuitboards which are attached to the pins in tandem and whose peripheries are provided with diametrically-opposite pairs of terminals for connecting the coupling circuit elements with the terminals projecting through the wall of the insert. The respective coupling circuits and circuitboards are secured in position by means of insulating spacers which hold the circuitboards at a suitable distance from each other. In this manner, the mounted coupling circuits cannot only be exchanged very readily but can also be connected, in the required number, with the remainder of the circuitry.

Appropriately, the face of the insert located within the pressure-tight motor housing is provided with a sleeve or collar on which a protective tube, open at both ends and surrounding the coupling circuits, can be mounted and fixed in a detachable manner. This tube prevents damage to the coupling circuits during transportation and also during insertion and removal of the insert underground. The protective tube is suitably provided with diametrically-opposite windows such that the coupling circuits carried on the insert are easily accessible from the outside.

The above and other objects and features of the invention will become apparent from the following detailed description taken in connection with the accompanying drawings which form a part of this specification, and in which:

FIG. 1 is an illustration of a typical pressure-tight housing for a mining machine motor showing the manner in which the inserts of the invention fit into openings in a wall thereof;

FIG. 2 is a longitudinal cross section through the insert of the invention;

FIG. 3 is an end view of the insert of the invention, with the front cover thereof being removed; and FIG. 4 is a schematic circuit diagram of an electrical control circuit with which the insert of the present invention may be employed.

With reference now to the drawings, and particularly to FIG. 1, there is shown a pressure-tight housing 10 for the drive motor of a mining machine, the output shaft of the drive motor being identified by the reference numeral 10A. The main power cable lead-in is identified by the reference numeral 10B; while the switchgear and high voltage circuits for the drive motor are housed within a pressure-tight housing having a cover plate identified by the reference numeral 10C. The inserts of the present invention for connecting the high voltage circuits within the housing 10 to external, intrinsically-safe circuits are identified by the reference numeral 2. While only two inserts are shown in FIG. 1, it will be appreciated that the number of inserts can be increased to suit the requirements of a particular mining machine installation.

The details of the inserts 2 are shown in FIG. 2. The external wall of the pressure-tight housing 10 is identified by the reference numeral 1. Within the housing are the requisite control elements for controlling the cutting element, the winch, the drive motor itself or the like, a typical one of said control elements being shown in the schematic circuit of FIG. 4 and identified by the reference numeral 4. The insert 2 is provided with a flange 3 which engages and rests against the outside wall 1 of the housing 10. It is retained within an aperture 1A in the wall 1 by means of bolts, identified by the reference numeral 5 in FIG. 3. Connecting terminals 8 (FIGS. 2 and 3) are located within an explosion-proof chamber 7 formed in the insert 2. The explosion-proof chamber 7 is closed by means of a cover plate 6 secured to the flange 3 by means of suitable bolts or the like. Electrical leads from an external intrinsically-safe circuit (not shown in FIGS. 2 and 3) are connected to the ends of terminals 8 within the explosion-proof chamber 7 and pass through outlets 9 to a sensing or the like element, such as a switch, included in an intrinsically-safe circuit. Such a switch is identified by the reference numeral 26 in FIG. 4 and may, for example, comprise a pressure switch, or the switch of a position-determining pulse generator or the like.

Each of the connecting terminals 8 is firmly screwed into a wall 7A of the explosion-proof chamber 7 and projects into the pressure-tight housing 10 behind wall 1. Within housing 10 the terminals are shielded by a collar 11 integral with flange 3. Mounted on the periphery of the sleeve 11 is a protective tube 12, the tube 12 being fastened to the collar 11 by means of screws 13. The interior of the protective tube is accessible by means of diametrically-opposite windows or openings 14 formed therein. Pins 15 are firmly screwed into the rear face of the collar 11. These pins are perpendicular to the rear face of collar 11, parallel to each other and project into the housing 10. Individual coupling circuits 16, which incorporate transformers, are secured in tandem on the pins 15. Each coupling circuit 16 is carried on a circuitboard 17 which is provided with holes or openings aligned with the pins 15 and of such a diameter that they can slide over the pins. Spacers 18, formed from insulating material, retain the printed circuitboards 17 at suitable distances from each other and hold them firmly with respect each other along the length of the pins with the aid of nuts 19 threaded onto the ends of pins 15. Two pairs of connectors 20, 21 are located on each side of each circuitboard 17 adjacent the openings 14. Each coupling circuit 16 is connected to an associated pair of the connecting terminals 8 via its associated connectors 20 and 21 and, thus is connected with an external, intrinsically-safe circuit identified by the reference numeral 25 in FIG. 4. The coupling circuits 16 are also connected, as shown in FIG. 4, to a high voltage control element 4 of the mining machine enclosed within the pressure-tight housing 10.

With specific reference to FIG. 4, numeral 22 denotes a transformer associated with a coupling circuit 16. The primary winding of the transformer 22 is connected to the high voltage apparatus with the pressure-tight housing and to a relay 23 utilized to actuate the control element 4. The secondary winding of the transformer 22 is connected via connecting terminals 8 and an intrinsically-safe circuit 25 with the external switching element 26 which actuates the control element 4. When switch 26 in the external, intrinsically-safe circuit closes, for example, relay 27 is energized; whereupon contacts 29 in the primary circuit close. This applies the voltage appearing across the primary winding of transformer 22 to the relay 23 which becomes energized, thereby closing its contacts 24 and connecting the control element to control circuitry within the pressure-tight housing 10.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. In a mining machine of the type operated in an explosive atmosphere, the combination of a pressure-tight housing for the drive motor means for said mining machine, switchgear elements for said mining machine said pressure-tight housing enclosing said switchgear elements for the mining machine, an opening in a wall of said housing, an insert fitted into said opening and sealed around said opening to maintain said housing pressure-tight, electrical circuit elements carried on said insert within said pressure-tight housing and acting to transform high voltage electrical energy to low voltage energy suitable for use in an intrinsically-safe circuit, an explosion-proof chamber formed on the forward face of said insert, electrical terminal means extending through a wall of said insert and into said explosion-proof chamber, means connecting said electrical circuit elements carried on said insert to the ends of said terminal means within said pressure-tight housing, and means for connecting the terminals of an intrinsically-safe circuit to the other ends of said terminal means within said explosion-proof chamber.

2. The combination of claim 1 including pins distributed around the periphery of said insert and projecting into said pressure-tight housing, said electrical circuit elements being carried on said pins in tandem, and fastened thereto.

3. The combination of claim 2 wherein said electrical circuit elements are mounted on printed circuitboards carried on said pins, the circuitboards being provided with diametrically-opposite pairs of connectors which connect said circuit elements to said terminal means.

4. The combination of claim 3 including spacers mounted on said pins between individual ones of said circuit-boards, holding them at a suitable distance from each other.

5. The combination of claim 2 including a collar provided on said insert on the side thereof within said pressure-tight housing, and a protective tube carried by said colalr for enclosing said circuit elements.

6. The combination of claim 5 wherein said protective tube is provided with dametrically-opposite openings to permit access to the circuit elements carried within said protective tube.

* * * * *